(12) United States Patent
Tangudi

(10) Patent No.: US 9,325,212 B2
(45) Date of Patent: Apr. 26, 2016

(54) MOTOR INCLUDING FLEXIBLE PRINTED CIRCUIT BOARD STATOR

(71) Applicant: Hamilton Sundstrand Corporation, Charlotte, NC (US)

(72) Inventor: Jagadeesh Tangudi, Manchester, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 252 days.

(21) Appl. No.: 13/917,915

(22) Filed: Jun. 14, 2013

(65) Prior Publication Data
US 2014/0368074 A1    Dec. 18, 2014

(51) Int. Cl.
*H02K 1/27* (2006.01)
*H02K 3/26* (2006.01)
*H02K 3/46* (2006.01)
*H02K 21/22* (2006.01)
*H02K 7/14* (2006.01)
*H02K 11/00* (2016.01)
*H02K 3/28* (2006.01)

(52) U.S. Cl.
CPC .. *H02K 3/46* (2013.01); *H02K 1/27* (2013.01); *H02K 7/14* (2013.01); *H02K 21/22* (2013.01); *H02K 3/26* (2013.01); *H02K 3/28* (2013.01); *H02K 11/0073* (2013.01)

(58) Field of Classification Search
CPC ....... H02K 3/26; H02K 3/46; H02K 11/0073; H02K 1/27; H02K 21/12; H02K 3/47

USPC ........ 310/67 R, 68 B, 71, 91, 156.01, 156.38, 310/156.55, 177, 180, 193, 208, 209, 310/216.002, 216.074, 242, 261.1, 266, 310/268, 43, 49.43, 54; 29/598, 602.1; 318/400.41, 568.11; 360/271.7, 98.07, 360/99.04, 99.08; 74/5.22
See application file for complete search history.

(56) References Cited

U.S. PATENT DOCUMENTS

| | | | | |
|---|---|---|---|---|
| 5,413,010 | A | * | 5/1995 | Nakanishi et al. ............. 74/5.22 |
| 6,455,975 | B1 | * | 9/2002 | Raad et al. .................... 310/209 |
| 6,700,280 | B1 | * | 3/2004 | Geiger ................ H02K 1/2786 310/156.38 |
| 6,803,738 | B2 | * | 10/2004 | Erten ............................ 318/653 |
| 7,268,458 | B2 | * | 9/2007 | Lee et al. ............... 310/216.074 |
| 2006/0055272 | A1 | * | 3/2006 | Lee ........................ H02K 1/146 310/208 |
| 2011/0037354 | A1 | * | 2/2011 | Yan .......................... H02K 3/26 310/208 |

* cited by examiner

Primary Examiner — Michael Andrews
(74) Attorney, Agent, or Firm — Cantor Colburn LLP

(57) ABSTRACT

A motor having a compact and lightweight design may include a stator provided by a flexible printed circuit (flex circuit). The flex circuit may include a plurality of etched windings that provide coils for a plurality of motor phases. A printed circuit board of the motor may provide various device functions such as electrical commutation. The motor may be used in various applications such as a cooling fan for device electronics and gyroscopic applications.

17 Claims, 6 Drawing Sheets

AT OUTER DIAMETER

A CONNECTION

B CONNECTION

C CONNECTION

MOTOR INCLUDING FLEXIBLE PRINTED CIRCUIT BOARD STATOR

TECHNICAL FIELD

The present teachings relate to the field of electric motors and, more particularly, to a compact, lightweight electric motor design.

BACKGROUND

Electric cooling fans for dispersing heat generated by powered electronic devices such as microprocessors, power supplies, circuit boards, drive electronics, etc., are well known. Conventional electric cooling fans may include a fan blade connected to a shaft, wherein the shaft is rotated by an electric motor which spins the fan blade. The electric motor can include a rotor, including a plurality of permanent magnets, that is fixed to the shaft. The electric motor can further include a powered stationary stator that surrounds the permanent magnets and electromagnetically drives the rotor. The stator can include a plurality of coils formed from a plurality of wire windings. The powered stationary stator thus spins the rotor which, in turn, spins the shaft and the fan blade affixed to the shaft.

The electric cooling fan may be mounted to a base plate that functions as a heat sink for the electronic device being cooled. The rotating fan can provide airflow within a housing, where the airflow draws heat away from, and cools, the heat sink and thus the electronic device. In a first design, the motor projects from the surface of the base plate by a distance equal to a thickness of the stator, and the fan blade projects from the stator by at least a thickness of a portion of the fan blade. In a second design, the motor can be recessed within the surface of the base plate such that the shaft projects from the surface of the base plate. The first design requires more space within the housing than the second design, as space must be available for the thickness of the motor. However, in the first design, a mass of the base plate is not reduced. The second design is more compact than the first design, requiring less space within the housing because the motor is recessed within the base plate, but the mass of the heat sink is reduced as a recess within the base plate must be formed to receive the motor.

Additionally, reducing the weight of an electronic device is often a design goal, particularly in the aeronautics industry. Even a minimal decrease in component weight can reduce payload costs significantly.

An electric fan, for example an electric cooling fan, which requires less space and has a decreased weight compared to some conventional electric fans would be desirable.

SUMMARY

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

In an embodiment of the present teachings, an electric motor may include a motor stator including a flexible printed circuit, wherein the flexible printed circuit includes a plurality of coils, a motor rotor including a plurality of permanent magnets, wherein the motor rotor is spaced apart from the flexible printed circuit, and a power signal connected to the plurality of coils and configured to power the plurality of coils, wherein the electric motor is configured to rotate the motor rotor around the motor stator during application of power to the plurality of coils.

In another embodiment of the present teachings, a method for operating an electric motor can include applying a power signal to a flexible printed circuit comprising a plurality of motor stator coils formed on the flexible printed circuit to generate an electromagnetic field, and rotating a motor rotor around the plurality of motor stator coils using the electromagnetic field, wherein the plurality of permanent magnets spaced apart from the flexible printed circuit.

BRIEF DESCRIPTION OF THE DRAWINGS

The accompanying drawings, which are incorporated in and constitute a part of this specification, illustrate embodiments of the present teachings and together with the description serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

An embodiment of the present teachings may result in an electric motor that is lighter and more compact than some conventional motor designs. The electric motor is described herein with reference to a particular embodiment for use as a cooling fan, but it will be understood that other embodiments and uses are also contemplated.

Figure 1:
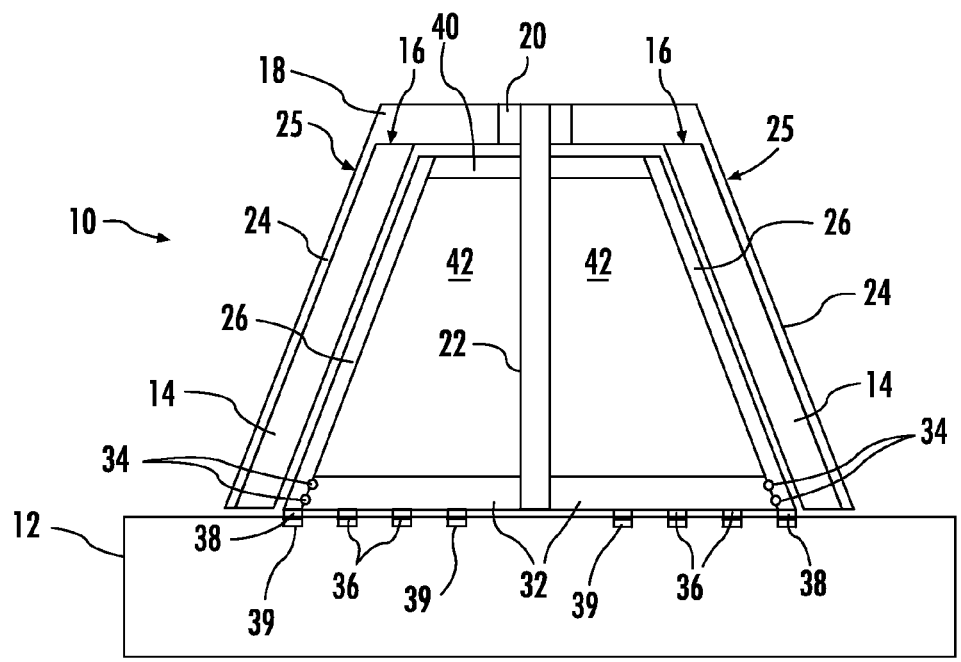
FIG. 1 is a cross section.
Figure 2:
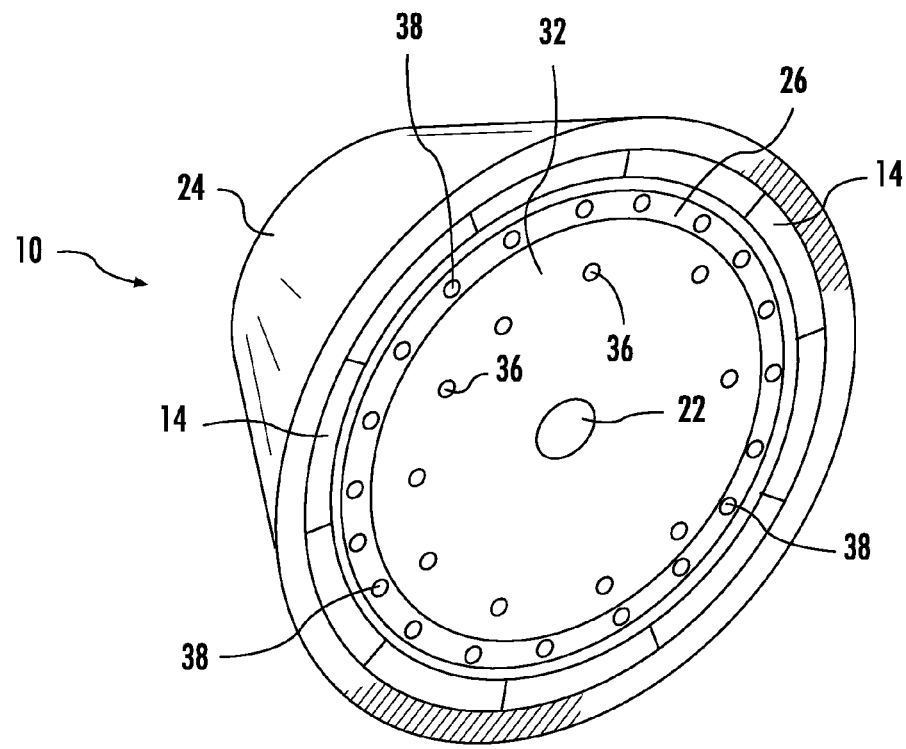
FIG. 2 is a perspective depiction, of a motor in accordance with an embodiment of the present teachings.

FIG. 1 is a cross section, and FIG. 2 is a perspective view, depicting a cooling fan 10 in accordance with an embodiment of the present teachings. The cooling fan 10 may be mounted to a substrate 12 as depicted in FIG. 1. The substrate 12 may be a base plate, a heat sink, or an electronic device such as a power supply, motherboard, driver board, or other substrate, for example that generates heat during operation.

Figure 3:
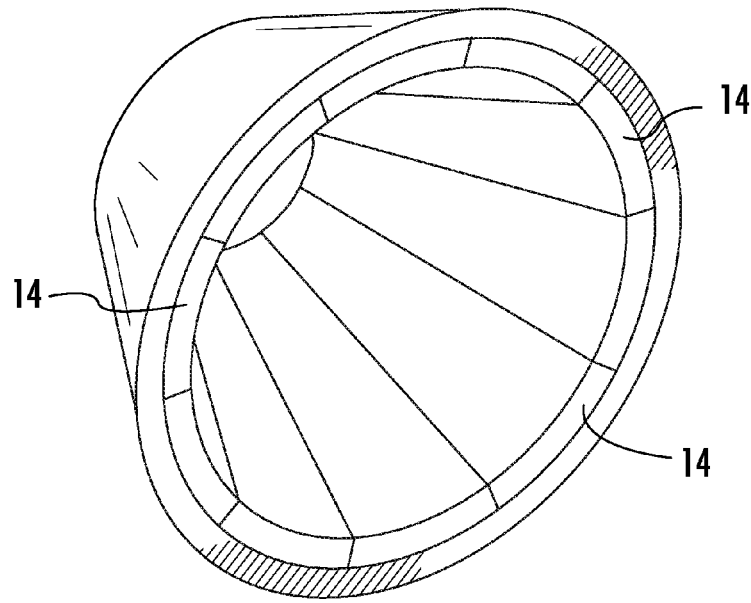
FIG. 3 is a perspective depiction of a permanent magnet set attached to a housing for use as a rotor in accordance with an embodiment of the present teachings.
Figure 5:
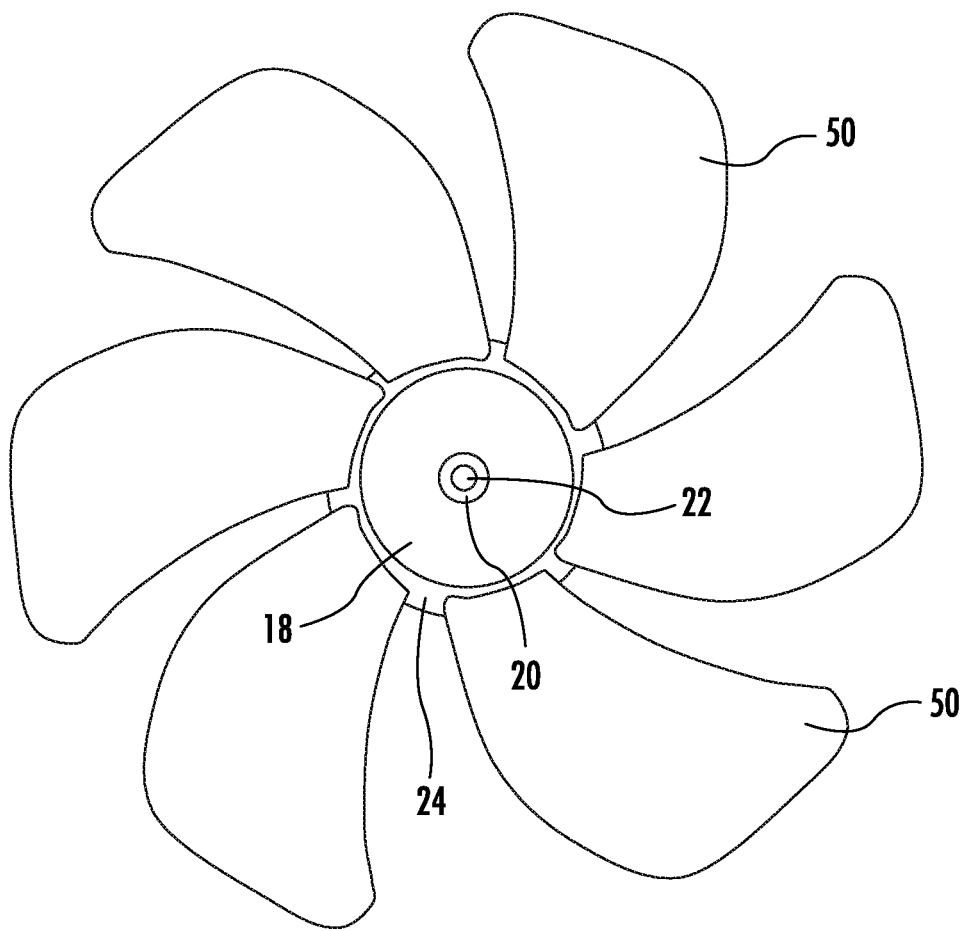
FIG. 5 is a plan view depicting a plurality of fan blades attached to, or molded as a single piece with, a rotor housing.

In the FIG. 1 embodiment, an electric motor includes a rotor and a stator. The rotor includes a plurality of permanent magnets 14 arranged in a cone shape (i.e., a truncated cone shape) as depicted in FIG. 3. At least a top surface 16 of the plurality of the permanent magnets 14 is attached to a bearing plate 18 that includes a bearing 20 attached to a fixed shaft 22. The bearing plate 18 may be circular, square, rectangular, etc. The bearing plate 18 may also include a cone shaped housing (i.e., back iron) 24. The cone shaped housing 24 may also include molded fan blades 50 extending from the surface 25 of the housing 24 that is opposite the magnets as depicted in FIG. 5. The permanent magnets 14 may be affixed to the bearing plate 16 and/or the housing 24 using an adhesive (not individually depicted for simplicity). The bearing plate 18 and the housing 24 may be formed, for example, from a non-magnetic metal such as aluminum, or from a synthetic polymer such as plastic or nylon. A rotor in accordance with the present embodiment thus includes permanent magnets 14, bearing plate 18, and a portion of the bearing 20, and may include housing 24.

Figure 4A:
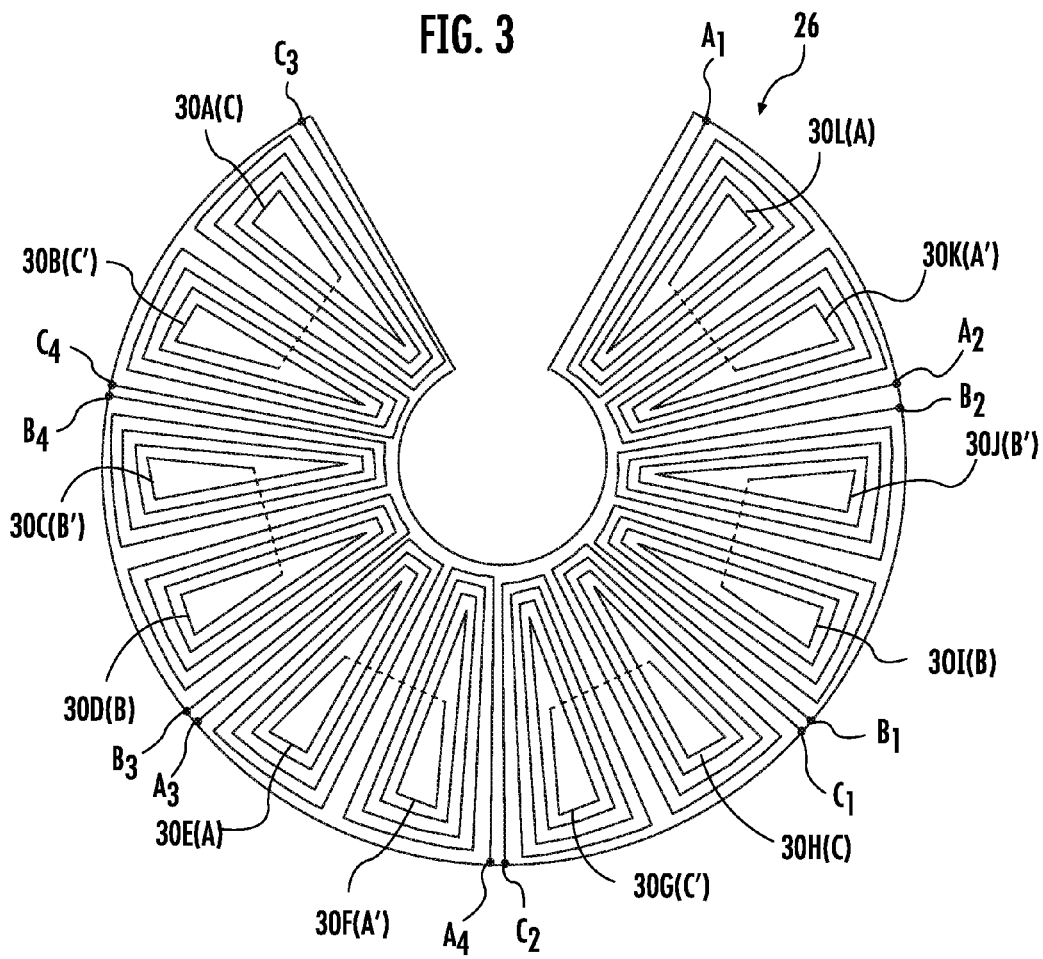
FIG. 4A is a plan view of a flexible printed circuit including a plurality of coils for use as a motor stator in accordance with an embodiment of the present teachings.
Figure 4B:
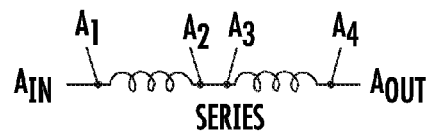
FIG. 4B is a simplified schematic depicting exemplary connections in one particular embodiment.
Figure 4B:
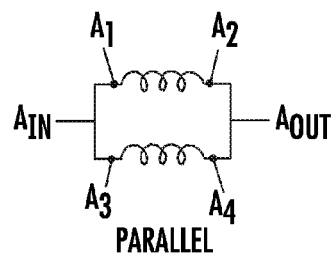
Figure 4B:
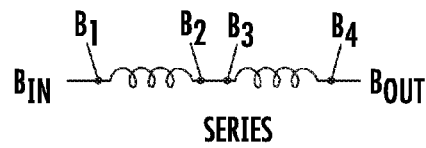
Figure 4B:
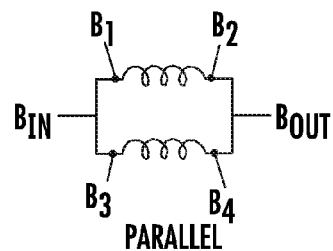
Figure 4B:
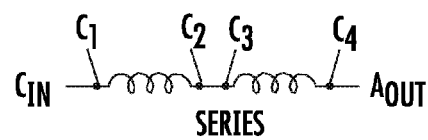
Figure 4B:
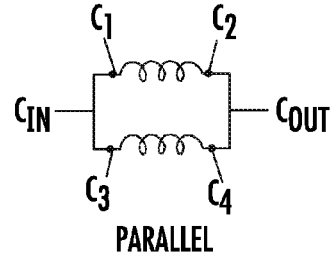

The stator includes a flexible printed circuit (flex circuit) 26 having a wiring pattern 30 (FIG. 4), for example an etched wiring pattern in accordance with known flex circuit design. The wiring pattern 30 may include a plurality of windings or coils 30A-30L. In FIG. 4A, an exemplary coil phase for each winding is designated in parentheses after the reference number, with exemplary series and parallel connection patterns depicted in FIG. 4B. The flex circuit 26 of FIG. 4A is depicted in a flat configuration after manufacture but before it is placed into the truncated cone shape of FIGS. 1 and 2. The flex circuit 26 may be a single layer or a multi-layer flex circuit, which may accommodate several coil turns to achieve a desired device performance. It will be appreciated that the depicted pattern of windings 30A-30L is exemplary and FIG. 4 depicts only one particular case. Other slot-pole combinations are contemplated.

The stator may further include a circular printed circuit board (PCB) 32, for example a rigid PCB, attached to the shaft 22. The PCB 32 may be attached to, and in electrical communication with (i.e., electrically coupled to), the flex circuit 26 through electrical connections 34 and/or electrical connections 36, 38. For illustration purposes, electrical connections 34 represent a direct electrical connection, for example solder, pin and socket, or another electrical connection, between the flex circuit 26 and the PCB 32. Electrical connections 38 represent a direct electrical connection, for example solder, pin and socket, a ball grid array (BGA) between the flex circuit 26 and wiring 39 on the substrate 12. Electrical connections 36 represent a direct electrical connection between the PCB 32 and the wiring 39 on the substrate 12. In an embodiment, connections 36, 38, 39 may include bond pads or BGA balls connected together using solder for a surface mount connection, pins and sockets for a pluggable connection, or other electrical connections. The PCB 32 may receive power (i.e., power signal) and ground (i.e., ground signal) from wiring 39 through electrical connections 36 and the flex circuit 26 may receive power and ground from wiring 39 through electrical connections 38. In another embodiment, power and ground are passed from wiring 39 on the substrate 12 to the PCB 32 through connections 36, then to the flex circuit 26 through electrical connections 34. The electrical connections 34, 36, 38 may pass signals other than power and ground, for example temperature information, motor functioning information such as motor speed, etc., from the PCB 32.

Figure 6:
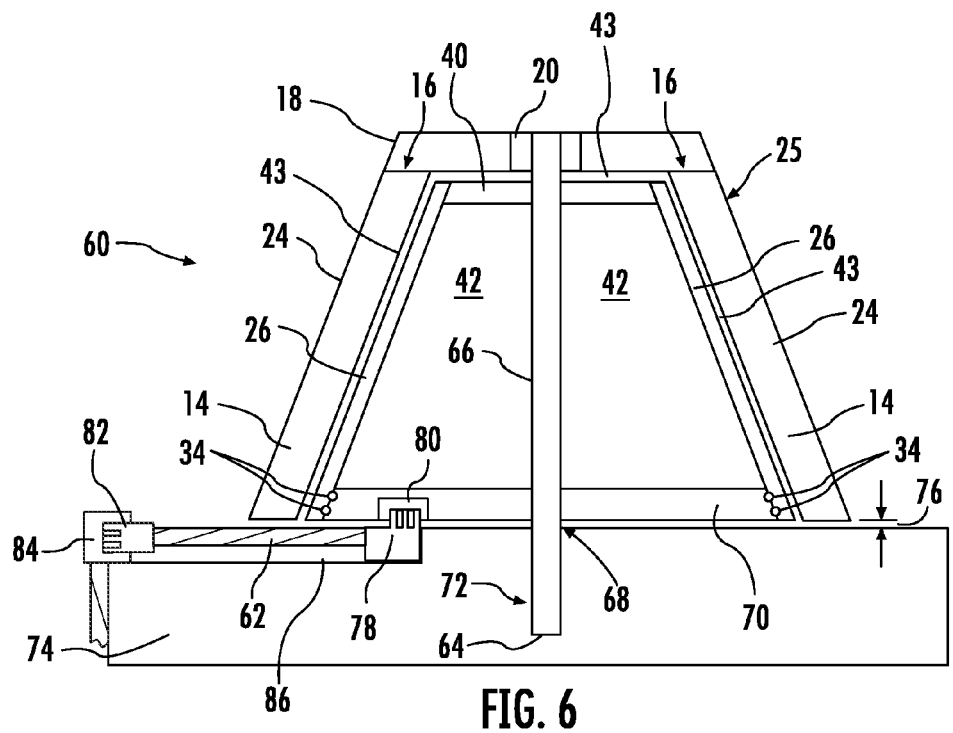
FIG. 6 is a cross section.

In FIG. 4A, the terminal ends of each coil 30A, 30B, 30G, and 30H are connected appropriately at the outside edge of the flex circuit 26 to form a complete phase C coil, for example to facilitate connection of the coils with a connector such as connections 34 and/or connector 78 (FIG. 6). Similarly, 30C 30D, 30I and 30J form phase B winding and 30E, 30F, 30K, and 30L form a complete phase A winding. All the terminal ends of each of these phase winding are thus positioned at the bottom of the truncated cone near the printed circuit board 32 (FIG. 1) of the stator, although other embodiments of the present teachings are contemplated. The printed circuit board 32 may be attached to the shaft 22, the flexible printed circuit (i.e., flex circuit) 26 is electrically coupled to, and may be physically attached to, the printed circuit board 32. Both the printed circuit board 32 and the flexible printed circuit 26 may be stationary during operation of the motor.

For structural integrity, a support disk 40 may be attached to the shaft 22 and to an upper portion (i.e., the narrower diameter) of the flex circuit 26 as depicted in FIG. 1. In this embodiment, region 42 is hollow. In another embodiment, region 42 and support disk 40 may be a single hollow shell or a single solid core attached to the shaft 22 and the flex circuit 26. Portions of the rotor are separated and spaced apart from portions of the stator by a space or air gap 43.

The depicted embodiment is a 3 phase machine (i.e., three coil phases "A," "B," and "C" as depicted in FIG. 4) with 12 slots ("ns," i.e., 12 stator windings 30A-30L) and 10 poles ("np," i.e., 10 permanent magnets 14). While the windings 30A-30L depicted in FIG. 4 are a double layer winding, it will be understood that a structure according to an embodiment of the present teachings may include multi-phase winding configurations to achieve better performance. Winding may be single layer where the number of coils equals one-half the number of slots. Winding may also be, for example, double layer wherein the number of coils equals one-half the number of slots or double layer where the number of coils equals the number of slots. The number of stator windings on the flex circuit 26 may be a multiple of the number of phases ("ph") to help achieve a balanced winding (ns=k*ph), where k is an integer. The number of poles (i.e., np) may be configured, for example, where np=ns±1, np=ns±2, np=ns±3, etc., where np is even. Improved motor performance is achieved as the number of slots (ns) becomes closer to the number of poles on the rotor. These relationships may also be extended to multi-phase topologies.

The operation of a motor is well understood in the art. In this embodiment, power and ground (i.e., power functions) may be supplied to the motor from wiring 39 on the substrate 12. Power functions can be supplied to the PCB 32 through electrical connections 36, and to the flex circuit 26 through either electrical connections 38 from the substrate 12 and/or from the PCB 32 through electrical connections 34.

Power functions passed through each coil 30A-30L, along with circuitry on the PCB 32, create an electromagnetic field sequentially in each coil phase. Motor commutation, in this embodiment for the three phases A, B, C as depicted in FIG. 4, may be performed electronically by the circuitry on the PCB 32. The electric field generated by the coils interact with magnetic fields from the permanent magnets 14, and the rotor, including permanent magnets 14, begin to rotate on bearing 20 and rotational speed increases with continued power to the motor 10.

Thus, referring to FIG. 1, the shaft 22 may be rigidly affixed to the PCB 32. As a result of electromagnetic interaction between the coils 30 and the permanent magnets 14, the bearing 20 attached to the shaft 22 rotates around the shaft 22. This rotates the bearing plate 18 attached to the bearing 20, the housing 24 attached to the bearing plate 18, and the permanent magnets 14 that are attached to at least one of the housing 24 and the bearing plate 18. The fan blades 50 that are attached to, or molded as a solid piece with, the housing 24 are thus rotated along with the rotor.

With regard to FIG. 1, it is contemplated that functionality of the PCB 32 may be provided by circuitry on the substrate 12. Thus structure 32 may represent a disk that is provided for structural support and not electrical functionality. In this embodiment, electrical functionality and commutation may be provided to flex circuit 26 through electrical connections 38. In another embodiment, structure 32 may be omitted entirely, particularly if region 42 includes a support member such as a rigid hollow shell or solid core.

This embodiment thus provides a surface mount motor that may be used in applications such as a cooling fan for electronics, gyroscopic applications, medical applications, computer industry uses, robotics, communications, instrumentation, inspection equipment, security technology, consumer applications, applications where space/volume is a constraint, and others.

In an embodiment, for assembly into a cone shape, the permanent magnets 14 may have a particular shape. Each magnet 14, referring to FIG. 3, for example, has a narrower width at the top (i.e., toward the small end of the truncated cone) than at the bottom (i.e., toward the large end of the truncated cone). A back surface and a front surface of each magnet are arcuate in shape, with the back surface being convex and the front surface being concave. An angle of each edge of each magnet 14 is less than 90° to fit tightly against each adjacent magnet. The inside surface of each magnet 14 that faces, or is adjacent to, the flex circuit 26 may include a concave surface while the outside surface opposite the inside surface may include a convex surface, as depicted in FIG. 2. In another embodiment, the inside surface of each magnet 14 may have an arcuate, convex, or "bread loaf" contour or shape to provide a smoother magnetic field at the space or air gap 43 (FIG. 6). In cross section, magnets 14 having a convex inside surface may appear as they do in FIG. 1, but would have a scalloped surface around the inside surface of the magnets which form the rotor, and when viewed from the bottom (i.e., when viewing the end of the truncated cone having the larger diameter). Additionally, some designs may leave a space or gap (not individually depicted for simplicity) between each adjacent magnet 14 for electromagnetic and/or thermal reasons.

In various embodiments, the magnetic flux generated by the permanent magnets 14 may be orthogonal to the field generated by the stator windings 30. These fields result in electromagnetic torque that may be used to rotate the fan blades 50. The rotational mechanism of the present teachings may be used to provide a fan which is more compact and has a reduced weight, thus achieving a higher torque to weight ratio than some conventional designs. Further, a cost of manufacturing the stator windings 30 on the flex circuit 26 is anticipated to be less than the cost of manufacturing traditional stator windings, thus reducing overall costs of the motor. Embodiments may be suitable for various applications, for example low torque, high speed uses such as a cooling fan as described above, or other uses.

Figure 7:
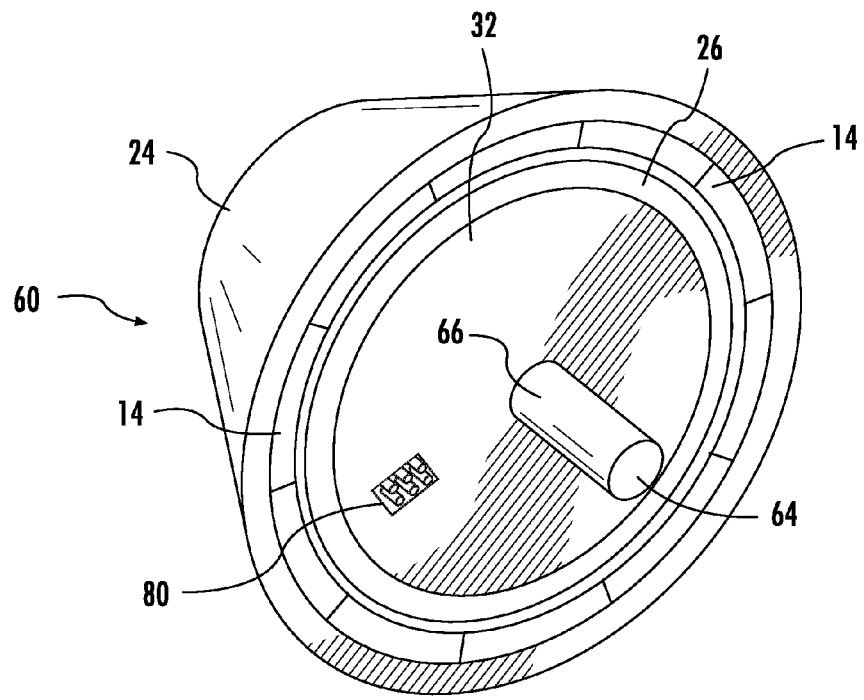
FIG. 7 is a perspective depiction, of a motor in accordance with another embodiment of the present teachings.

Various other embodiments are contemplated. For example, FIGS. 6 and 7 depict an embodiment which powers the motor 60 using a cable 62 rather than from surface mount electrical connections as described with reference to FIG. 1. In this embodiment, a lower end 64 of a fixed shaft 66 protrudes from an opening 68 in the PCB 70. The fixed shaft 66 is inserted into an opening 72 in a substrate 74 of an electronic device. The substrate 74 may be a heat sink, a circuit board, or another portion of an electronic device. The cable 62 may provide input and/or output signals to and/or from the PCB 70 and/or flex circuit 26.

A depth of the opening 72 in the substrate 74 and the length of the shaft 66 determines the spacing 76 between the motor 60 and the substrate 74. In an embodiment, a first connector 78 at a first end of the cable 62 may plug into a connector 80 in the motor 60. A second connector 82 at a second end of the cable 62 can plug into a connector 84 in or on the substrate 74. To achieve a compact design, the cable 62 and connectors 78, 82, 84 may be located within a groove, channel, or other recess 86 within the substrate 74. Power and ground may be supplied from the substrate 74 to the motor 60 through the cable 62. The cable 62 may pass signals other than power and ground, for example temperature information, motor functioning information such as motor speed, etc., from the PCB 70 to the substrate 74. Additionally, the cable 62 may be hard wired to the motor 60 or to the substrate 74.

Figure 8:
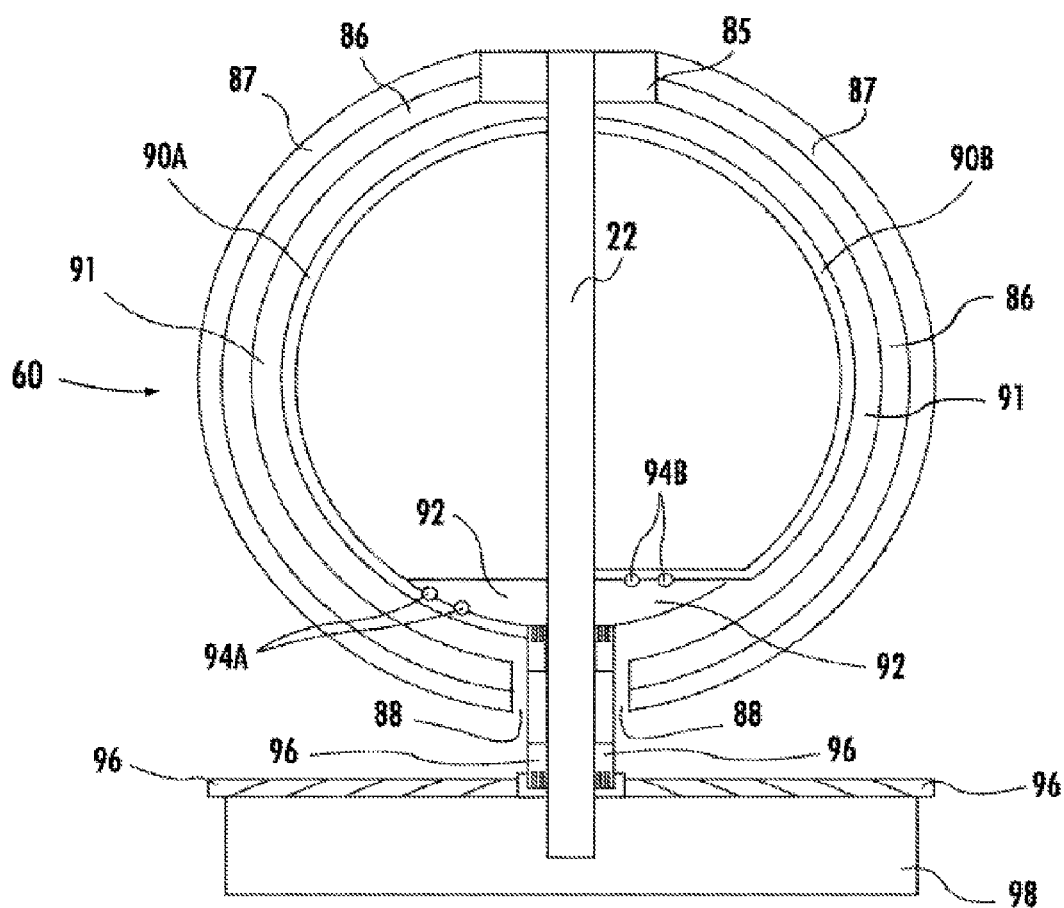
FIG. 8 is a cross section of a motor in accordance with another embodiment of the present teachings.

It is contemplated that, instead of a cone shape, the flex circuit stator of a motor formed in accordance with the present teachings may have other shapes, such as a spherical shape as depicted in FIG. 8 or a cylindrical shape, with openings at either end for a shaft. The plurality of permanent magnets of the rotor may have a shape that matches the shape of the stator. Increasing the surface area of the coils on the stator and the permanent magnets may improve motor torque and/or motor speed. Compared to a cylinder, a conical motor as depicted in FIG. 1 and a spherical motor may provide an increased coil and permanent magnet surface area while maintaining a lower profile, however an embodiment of the present teachings may include any shape that incorporates a flexible printed circuit as a portion of the stator.

For example, FIG. 8 depicts a motor 60 having a spherical shape. A spherical motor 60 can include a shaft 222, a rotatable bearing 85 attached to the shaft 222, and a plurality of semi-hemispherical-shaped permanent magnets 86 attached to the bearing 85 and operable to rotate around the shaft 222, and which form a spherical shape. A semi-hemispherical-shaped housing 87 (i.e., back iron) may be provided on the back (outside surface) of the permanent magnets 86. The shaft 22 may extend through an opening 88 in the bottom of the plurality of permanent magnets 86 and housing 87. In this embodiment, the permanent magnets 86 are attached only at the top of the shaft 22 by the bearing 85. The spherical motor 60 further includes a spherical flex circuit 90 that may be attached to the shaft 22 toward the top of the shaft 22 and separated from the permanent magnets 86 by a gap 91. Motor 60 may further include a printed circuit board 92 attached to the shaft 222. As depicted at the left side of FIG. 8, the flex circuit 90A may extend under the printed circuit board 92, with electrical connections 94A passing power, ground, and other signals between the printed circuit board 92 and the flex circuit 90A. In another embodiment, depicted at the right side of FIG. 8, the flex circuit 90B may extend over a top of the printed circuit board 92 with electrical connections 94B passing power, ground, and other signals between the printed circuit board 92 and the flex circuit 90B. The motor 60 may be electrically connected to a power supply (not individually depicted for simplicity) through one or more cables 96 as depicted, although other connections are also contemplated. The shaft 22 may be secured to a substrate 98 as depicted, or using another technique.

With the embodiments of FIGS. 1 and 6, the flex circuit 26 may extend over the top of the printed circuit board 32, 70 respectively and attach to the printed circuit board 32, 70 using top PCB connections such as connections 94B depicted in FIG. 8 rather than at the sides of the printed circuit board 32, 70 as depicted in FIGS. 1 and 6.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. An electric motor, comprising:
    a motor stator comprising a flexible printed circuit, wherein the flexible printed circuit comprises a plurality of coils, the flexible printed circuit forming a truncated cone shape;
    a housing that supports a motor rotor comprising a plurality of permanent magnets, wherein the motor rotor is spaced apart from the flexible printed circuit; and
    a power signal connected to the plurality of coils and configured to power the plurality of coils, wherein the electric motor is configured to rotate the motor rotor around the motor stator during application of power to the plurality of coils;
    a printed circuit board attached to a shaft and electrically coupled to the flexible printed circuit, wherein the printed circuit board is in electrical commutation with the flexible printed circuit board so as to deliver the power signal to the plurality of coils,
    wherein the plurality of permanent magnets are interposed between the housing and the flexible printed circuit, and having a shape that matches the shape of the flexible printed circuit to form a truncated cone shape such that a surface area of the coils on the stator and the permanent magnets is maximized to improve at least one of motor torque and motor speed.

2. The electric motor of claim 1, further comprising:
    a bearing attached to the shaft;
    the motor rotor is attached to the bearing, wherein the motor rotor is configured to rotate around the shaft through rotation of the bearing during the application of power to the plurality of coils.

3. The electric motor of claim 2, wherein the motor rotor is attached to the bearing through a circular bearing plate.

4. The electric motor of claim 1, wherein the printed circuit board comprises a plurality of electrical surface mount connections on a lower surface of the printed circuit board.

5. The electric motor of claim 1, further comprising a cable electrically coupled to the printed circuit board.

6. The electric motor of claim 5, wherein:
    the electric motor is electrically coupled to a substrate through the cable; and
    the substrate comprises a recess therein, wherein the cable is located within the recess.

7. The electric motor of claim 1, wherein:
    the flexible printed circuit forms a truncated cone shape;
    the plurality of permanent magnets form a truncated cone shape; and
    each of the plurality of coils comprises a first end and a second end positioned at a bottom surface of the truncated cone shape of the flexible printed circuit.

8. The electric motor of claim 1, wherein each of the plurality of permanent magnets comprises a convex inside surface adjacent to, and spaced apart from, the flexible printed circuit and a convex outside surface opposite the inside surface.

9. The electric motor of claim 1, wherein the flexible printed circuit defines a hollow region in the motor stator.

10. A method for operating an electric motor, comprising:
    attaching a printed circuit board to a shaft, wherein:
    electrically coupling a flexible printed circuit to the printed circuit board;
    applying a power signal to a flexible printed circuit formed as a truncated cone shape via the printed circuit board, the flexible printed circuit comprising a plurality of motor stator coils to generate an electromagnetic field, the power signal providing electrical commutation for the plurality of coils during operation of the motor; and rotating a motor rotor around the plurality of motor stator coils supported by a housing using the electromagnetic field, wherein the plurality of permanent magnets are spaced apart from the flexible printed circuit, wherein the plurality of permanent magnets are interposed between the housing and the flexible printed circuit, and have a shape that matches the shape of the flexible printed circuit to form a truncated cone shape such that a surface area of the coils on a motor stator and the permanent magnets is maximized to improve at least one of motor torque and motor speed.

11. The method of claim 10, wherein the plurality of permanent magnets are attached to a bearing that is attached to the shaft and the method further comprises rotating the plurality of permanent magnets around the shaft during the rotation of the motor rotor.

12. The method of claim 11, wherein the plurality of permanent magnets are attached to the shaft with a circular bearing plate, and the method further comprises rotating the circular bearing plate around the shaft during the rotation of the motor rotor.

13. The method of claim 12, wherein
the flexible printed circuit and the printed circuit board are stationary during operation of the motor.

14. The method of claim 13, wherein the printed circuit board receives electrical signals through electrical surface mount connections on a lower surface of the printed circuit board during operation of the motor.

15. The method of claim 13, wherein the printed circuit board receives electrical signals through an electrical cable attached to a lower surface of the printed circuit board during operation of the motor.

16. The method of claim 15, wherein:
the electric motor is electrically coupled to a substrate through the cable during operation of the motor; and
the substrate comprises a recess therein, wherein the cable is located within the recess during operation of the motor.

17. The method of claim 10, wherein the flexible printed circuit defines a hollow region in the motor stator.

* * * * *